United States Patent
Kumar et al.

(10) Patent No.: US 12,461,929 B2
(45) Date of Patent: Nov. 4, 2025

(54) DEEP MACHINE LEARNING CONTENT ITEM RANKER

(71) Applicant: ROKU, INC., San Jose, CA (US)

(72) Inventors: Kapil Kumar, London (GB); Rahul Agarwal, London (GB); Thanh Dang, Santa Clara, CA (US); Ratul Ray, Santa Clara, CA (US); Danish Shaikh, Daly City, CA (US); Srimaruti Manoj Nimmagadda, Saratoga, CA (US)

(73) Assignee: Roku, Inc., San Jose, CA (US)

( * ) Notice: Subject to any disclaimer, the term of this patent is extended or adjusted under 35 U.S.C. 154(b) by 78 days.

(21) Appl. No.: 18/195,041

(22) Filed: May 9, 2023

(65) Prior Publication Data

US 2024/0378213 A1    Nov. 14, 2024

(51) Int. Cl.
*G06F 16/25* (2019.01)
*G06F 16/2457* (2019.01)
(Continued)

(52) U.S. Cl.
CPC ...... *G06F 16/252* (2019.01); *G06F 16/24578* (2019.01); *G06F 16/248* (2019.01);
(Continued)

(58) Field of Classification Search
CPC ....... G06F 16/252; G06F 16/248; G06N 3/08; G06N 3/0895; G06N 3/09; G06N 3/091;
(Continued)

(56) References Cited

U.S. PATENT DOCUMENTS

| 2013/0073389 A1* | 3/2013 | Heath ............ G06Q 30/02 705/14.54 |
| 2017/0098012 A1* | 4/2017 | Zhu ............ G06F 16/24578 |

(Continued)

OTHER PUBLICATIONS

Gupta, U. et al., "The Architectural Implications of Facebook's DNN-based Personalized Recommendation," Feb. 15, 2020, Preprint for IEEE International Symposium on High-Performance Computer Architecture (HPCA 2020), 14 pages.
(Continued)

*Primary Examiner* — Kavita Stanley
*Assistant Examiner* — Lin Lin M Htay
(74) *Attorney, Agent, or Firm* — Sterne, Kessler, Goldstein & Fox P.L.L.C.

(57) ABSTRACT

Disclosed herein are system, method and/or computer program product embodiments, and/or combinations and subcombinations thereof, for ranking a plurality of content items for presentation to a user. An embodiment generates a ranking score for each content item by: providing input to a deep machine learning (ML) model, the input including at least one or more query features and one or more content item features, determining, by the deep ML model and based at least on the input, a first probability of a first type of interaction between the user and the content item and a second probability of a second type of interaction between the user and the content item, and calculating the ranking score for the content item based at least on the first and second probabilities. An embodiment ranks the content items for presentation based on the ranking score associated with each content item.

20 Claims, 7 Drawing Sheets

(51) Int. Cl.
  *G06F 16/248* (2019.01)
  *G06N 3/08* (2023.01)
  *G06N 3/0895* (2023.01)
  *G06N 3/09* (2023.01)
  *G06N 3/091* (2023.01)
  *G06N 3/092* (2023.01)
  *G06N 3/094* (2023.01)
  *G06N 3/096* (2023.01)
  *G06N 3/098* (2023.01)
  *G06N 3/0985* (2023.01)

(52) U.S. Cl.
  CPC ............. *G06N 3/08* (2013.01); *G06N 3/0895* (2023.01); *G06N 3/09* (2023.01); *G06N 3/091* (2023.01); *G06N 3/092* (2023.01); *G06N 3/094* (2023.01); *G06N 3/096* (2023.01); *G06N 3/098* (2023.01); *G06N 3/0985* (2023.01)

(58) Field of Classification Search
  CPC ........ G06N 3/092; G06N 3/094; G06N 3/096; G06N 3/098; G06N 3/0985
  See application file for complete search history.

(56) References Cited

U.S. PATENT DOCUMENTS

| | | | |
|---|---|---|---|
| 2017/0302979 A1* | 10/2017 | Kaya | H04N 21/234 |
| 2021/0019605 A1* | 1/2021 | Rouhani | G06N 7/01 |
| 2022/0207587 A1* | 6/2022 | Yang | G06V 40/10 |
| 2023/0195428 A1* | 6/2023 | Deng | G06N 3/04 |
| | | | 717/110 |

OTHER PUBLICATIONS

Naumov, M. et al., "Deep Learning Recommendation Model for Personalization and Recommendation Systems," May 31, 2019, 10 pages.
TensorFlow Recommenders, https://www.tensorflow.org/recommenders/, accessed May 10, 2023, 3 pages.
Captum • Model Interpretability for PyTorch, "Interpreting DLRM model with Captum¶," accessed May 10, 2023, 14 pages.

* cited by examiner

DEEP MACHINE LEARNING CONTENT ITEM RANKER

BACKGROUND

Field

This disclosure is generally directed to computer-implemented retrieval systems that rank retrieved items for presentation to a user.

Background

Retrieval systems exist that accept a query submitted by a user and then, based on the query, attempt to identify items of interest to the user. For example, some digital media players incorporate a search feature that enables users to submit queries to obtain access to desired media content, such as movies, TV shows, videos, music, or the like. Some conventional retrieval systems are designed to identify items of interest while the user is typing or otherwise inputting a query. For example, after each character of the query is entered, such systems may analyze what the user has input so far—even if it is only one character or a few characters and not a complete word—and attempt to identify items of interest based on the current input. When the input query is limited to only a very small number of characters, such systems may retrieve a mix of both relevant and irrelevant items. This may occur, for example, if a significant number of irrelevant items are determined to match the input character sequence. Typographical errors or misspellings in the query input can also lead to irrelevant items being retrieved.

To address this issue, many retrieval systems attempt to rank a set of retrieved items by predicting which of the retrieved items are most relevant to the user and sorting those items to the top of a list of search results. This can assist the user in finding desired items more quickly and easily. However, if the ranking algorithm also relies heavily on the query text, then it too may perform poorly when the query input is limited to just a few characters and/or when there are typographical errors or misspellings in the query. This can make it difficult for the user to locate and engage with items of interest. Further, this may cause the user to request information about irrelevant items or submit multiple different queries to locate desired items, thereby consuming computing resources of the retrieval system that could otherwise be conserved.

SUMMARY

Provided herein are system, apparatus, article of manufacture, method and/or computer program product embodiments, and/or combinations and sub-combinations thereof, for ranking a plurality of content items for presentation to a user in response to a submission of a query. An example embodiment operates by generating a ranking score for each content item in the plurality of content items by, for each content item: providing input to a deep machine learning (ML) model, the input including at least one or more query features associated with the query and one or more content item features associated with the content item; determining, by the deep ML model and based at least on the input, a first probability of a first type of user-item interaction between the user and the content item and a second probability of a second type of user-item interaction between the user and the content item; and calculating the ranking score for the content item based at least on the first probability and the second probability. The example embodiment ranks the plurality of content items for presentation to the user based on the ranking score associated with each content item in the plurality of content items.

In an embodiment, the input further includes one or more user features associated with the user.

In another embodiment, the plurality of content items comprise a plurality of recorded shows, and the one or more content item features associated with the content item comprise one or more of: a content item ID associated with the content item; a content type associated with the content item; an audio language associated with the content item; an origin country associated with the content item; a normalized representation of a number of times that a plurality of users have launched the content item for playback over a first predefined time period; a normalized representation of a number of times that the plurality of users have interacted with a user interface (UI) control associated with the content item to obtain information about the content item over a second predefined time period; a weighted sum of (i) a click through rate (CTR) for the content item when the content item was presented in relation to a submission of the query and (ii) a CTR for the content item when the content item was presented generally, wherein each CTR represents a number of times the plurality of users have interacted with the UI control associated with the content item to obtain information about the content item divided by a number of times the content item was presented to the plurality of users; or a weighted sum of (i) a long watch rate for the content item when the content item was presented in relation to a submission of the query and (ii) a long watch rate for the content item when the content item was presented generally, wherein each long watch rate represents a number of times the plurality of users watched the content item for longer than a third predefined time period.

In yet another embodiment, the plurality of content items comprise a plurality of televised sporting events, and the one or more content item features associated with the content item comprise one or more of: a sports league title associated with the content item; a live event or upcoming event classification associated with the content item; an ID of a home team associated with the content item; an ID of an away team associated with the content item; a normalized representation of a number of times that a plurality of users have launched the content item for playback over a first predefined time period; a normalized representation of a number of times that the plurality of users have interacted with a UI control associated with the content item to obtain information about the content item over a second predefined time period; a normalized representation of a measure of similarity between the query and the sports league title associated with the content item; a normalized representation of a measure of similarity between the query and a name of the home team associated with the content item; a normalized representation of a measure of similarity between the query and a name of the away team associated with the content item; or a normalized representation of an amount of time to a start time associated with the content item.

In still another embodiment, the first type of interaction between the user and the content item comprises the user launching the content item for playback and the second type of interaction between the user and the content item comprises the user interacting with a UI control associated with the content item to obtain information about the content item.

In a further embodiment, the deep ML model comprises a modified version of a deep learning recommendation model (DLRM).

In a still further embodiment, the input comprises one or more categorical features and the deep ML model generates multiple different embedding vectors for each of the one or more categorical features.

In a yet further embodiment, the deep ML model is trained by minimizing a loss function that includes a first term that represents categorical cross entropy for multiple candidate classification, a second term that represents binary cross entropy to predict a probability of the first type of user-item interaction, and a third term that represents binary cross entropy to predict a probability of the second type of user-item interaction.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, article of manufacture, method and/or computer program product embodiments, and/or combinations and sub-combinations thereof, for ranking a plurality of content items for presentation to a user in response to a submission of a query. An example embodiment operates by generating a ranking score for each content item in the plurality of content items by, for each content item: providing input to a deep ML model, the input including at least one or more query features associated with the query and one or more content item features associated with the content item; determining, by the deep ML model and based at least on the input, a first probability of a first type of user-item interaction between the user and the content item and a second probability of a second type of user-item interaction between the user and the content item; and calculating the ranking score for the content item based at least on the first probability and the second probability. The example embodiment ranks the plurality of content items for presentation to the user based on the ranking score associated with each content item in the plurality of content items.

Figure 1:
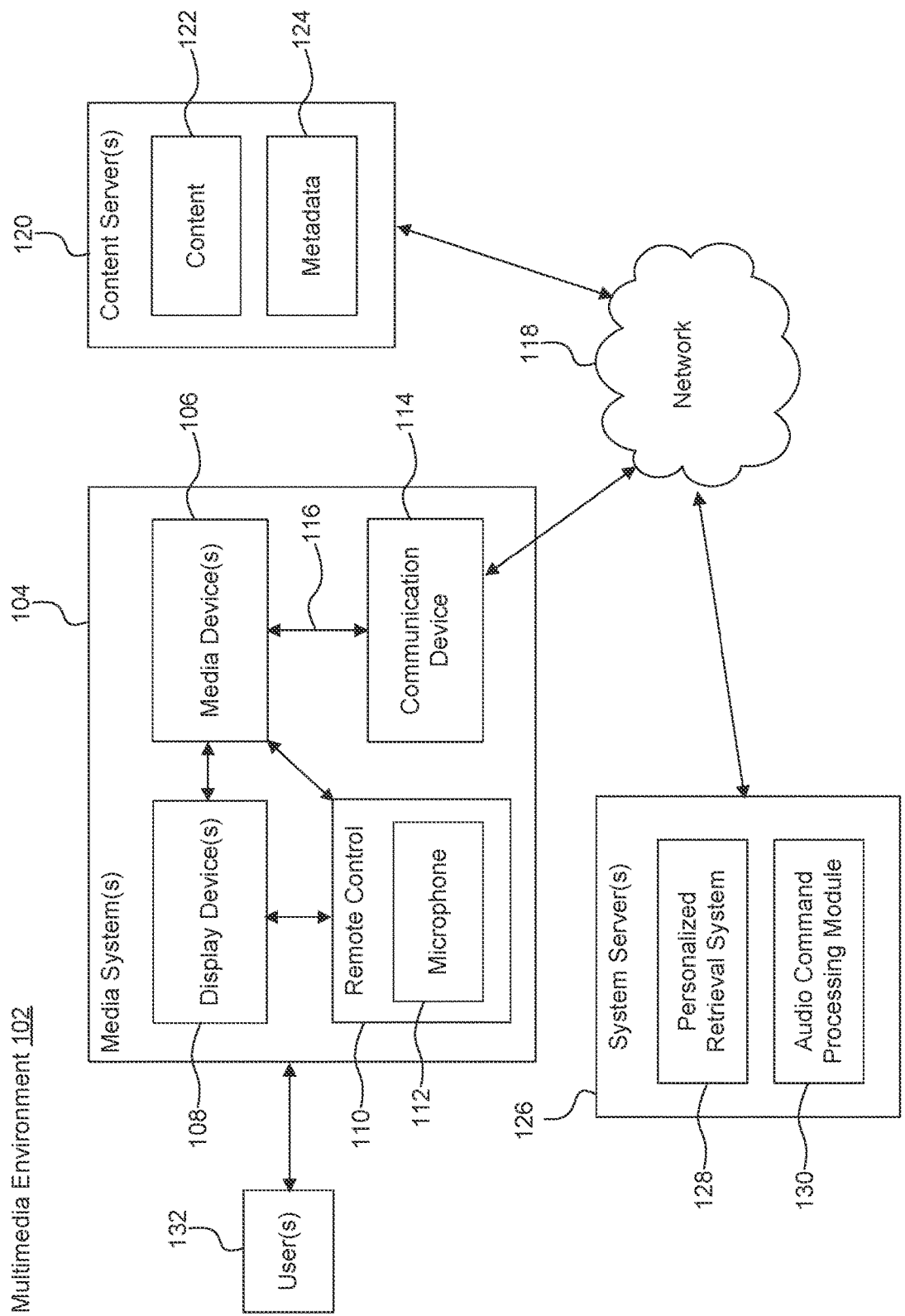
FIG. 1 illustrates a block diagram of a multimedia environment, according to some embodiments.

Various embodiments of this disclosure may be implemented using and/or may be part of a multimedia environment 102 shown in FIG. 1. It is noted, however, that multimedia environment 102 is provided solely for illustrative purposes, and is not limiting. Embodiments of this disclosure may be implemented using and/or may be part of environments different from and/or in addition to the multimedia environment 102, as will be appreciated by persons skilled in the relevant art(s) based on the teachings contained herein. An example of the multimedia environment 102 shall now be described.

Multimedia Environment

FIG. 1 illustrates a block diagram of a multimedia environment 102, according to some embodiments. In a non-limiting example, multimedia environment 102 may be directed to streaming media. However, this disclosure is applicable to any type of media (instead of or in addition to streaming media), as well as any mechanism, means, protocol, method and/or process for distributing media.

Multimedia environment 102 may include one or more media systems 104. A media system 104 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. User(s) 132 may operate with the media system 104 to select and consume content.

Each media system 104 may include one or more media devices 106 each coupled to one or more display devices 108. It is noted that terms such as "coupled," "connected to," "attached," "linked," "combined" and similar terms may refer to physical, electrical, magnetic, logical, etc., connections, unless otherwise specified herein.

Media device 106 may be a streaming media device, DVD or BLU-RAY device, audio/video playback device, cable box, and/or digital video recording device, to name just a few examples. Display device 108 may be a monitor, television (TV), computer, smart phone, tablet, wearable (such as a watch or glasses), appliance, internet of things (IoT) device, and/or projector, to name just a few examples. In some embodiments, media device 106 can be a part of, integrated with, operatively coupled to, and/or connected to its respective display device 108.

Each media device 106 may be configured to communicate with network 118 via a communication device 114. Communication device 114 may include, for example, a cable modem or satellite TV transceiver. Media device 106 may communicate with communication device 114 over a link 116, wherein link 116 may include wireless (such as Wi-Fi) and/or wired connections.

In various embodiments, network 118 can include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 104 may include a remote control 110. Remote control 110 can be any component, part, apparatus and/or method for controlling media device 106 and/or display device 108, such as a remote control, a tablet, laptop computer, smartphone, wearable, on-screen controls, integrated control buttons, audio controls, or any combination thereof, to name just a few examples. In an embodiment, remote control 110 wirelessly communicates with media device 106 and/or display device 108 using cellular, Bluetooth, infrared, etc., or any combination thereof. Remote control 110 may include a microphone 112, which is further described below.

Multimedia environment 102 may include a plurality of content servers 120 (also called content providers, channels or sources 120). Although only one content server 120 is shown in FIG. 1, in practice multimedia environment 102 may include any number of content servers 120. Each content server 120 may be configured to communicate with network 118.

Each content server 120 may store content 122 and metadata 124. Content 122 may include any combination of music, videos, movies, TV programs, multimedia, images, still pictures, text, graphics, gaming applications, advertisements, programming content, public service content, government content, local community content, software, and/or any other content or data objects in electronic form.

In some embodiments, metadata 124 comprises data about content 122. For example, metadata 124 may include associated or ancillary information indicating or related to writer, director, producer, composer, artist, actor, summary, chapters, production, history, year, trailers, alternate versions, related content, applications, and/or any other information pertaining or relating to content 122. Metadata 124 may also or alternatively include links to any such information pertaining or relating to content 122. Metadata 124 may also or alternatively include one or more indexes of content 122.

Multimedia environment 102 may include one or more system servers 126. System servers 126 may operate to support media devices 106 from the cloud. It is noted that the structural and functional aspects of system servers 126 may wholly or partially exist in the same or different ones of system servers 126.

System servers 126 may include a personalized retrieval system 128 that enables user 132 to search for and locate items of interest, such as particular content items stored by content servers 120. For example, media device 106 may provide a search interface (e.g., a graphical user interface (GUI)) that is presented to user 132 via display device 108. User 132 may enter a query into the search interface. For example, user 132 may use buttons or other mechanical features of remote control 110 to enter the query, or may speak the query into microphone 112. The query may be transmitted to personalized retrieval system 128 via network 118. Personalized retrieval system 128 may select, based on the query as well as on other information available thereto (e.g., information relating to the content items and information relating to the user), a set of content items that is deemed relevant to the query. Personalized retrieval system 128 may then transmit an identification of the selected content items (e.g., a list of titles and/or other information about the selected content items) to media device 106 for presentation to user 132 via the search interface. Personalized retrieval system 128 may rank the selected content items based on a predicted measure of relevancy to user 132 so that information about the content items can be presented in order of relevancy. The search interface may include controls that a user may interact with to obtain additional information about each content item that is identified and/or to play each content item.

Further details concerning an example implementation of personalized retrieval system 128 will be provided below in reference to FIGS. 3-8.

System servers 126 may also include an audio command processing module 130. As noted above, remote control 110 may include microphone 112. Microphone 112 may receive audio data from users 132 (as well as other sources, such as the display device 108). In some embodiments, media device 106 may be audio responsive, and the audio data may represent verbal commands from user 132 to control media device 106 as well as other components in media system 104, such as display device 108. Also, as noted above, the audio data may comprise a spoken query.

In some embodiments, the audio data received by microphone 112 in remote control 110 is transferred to media device 106, which then forwards the audio data to audio command processing module 130 in system servers 126. Audio command processing module 130 may operate to process and analyze the received audio data to recognize a verbal command of user 132. Audio command processing module 130 may then forward the verbal command back to media device 106 for processing. Audio command processing module 130 may also operate to process and analyze the received audio data to recognize a spoken query of user 132. Audio command processing module 130 may then forward the spoken query to personalized retrieval system 128 for processing.

Figure 2:
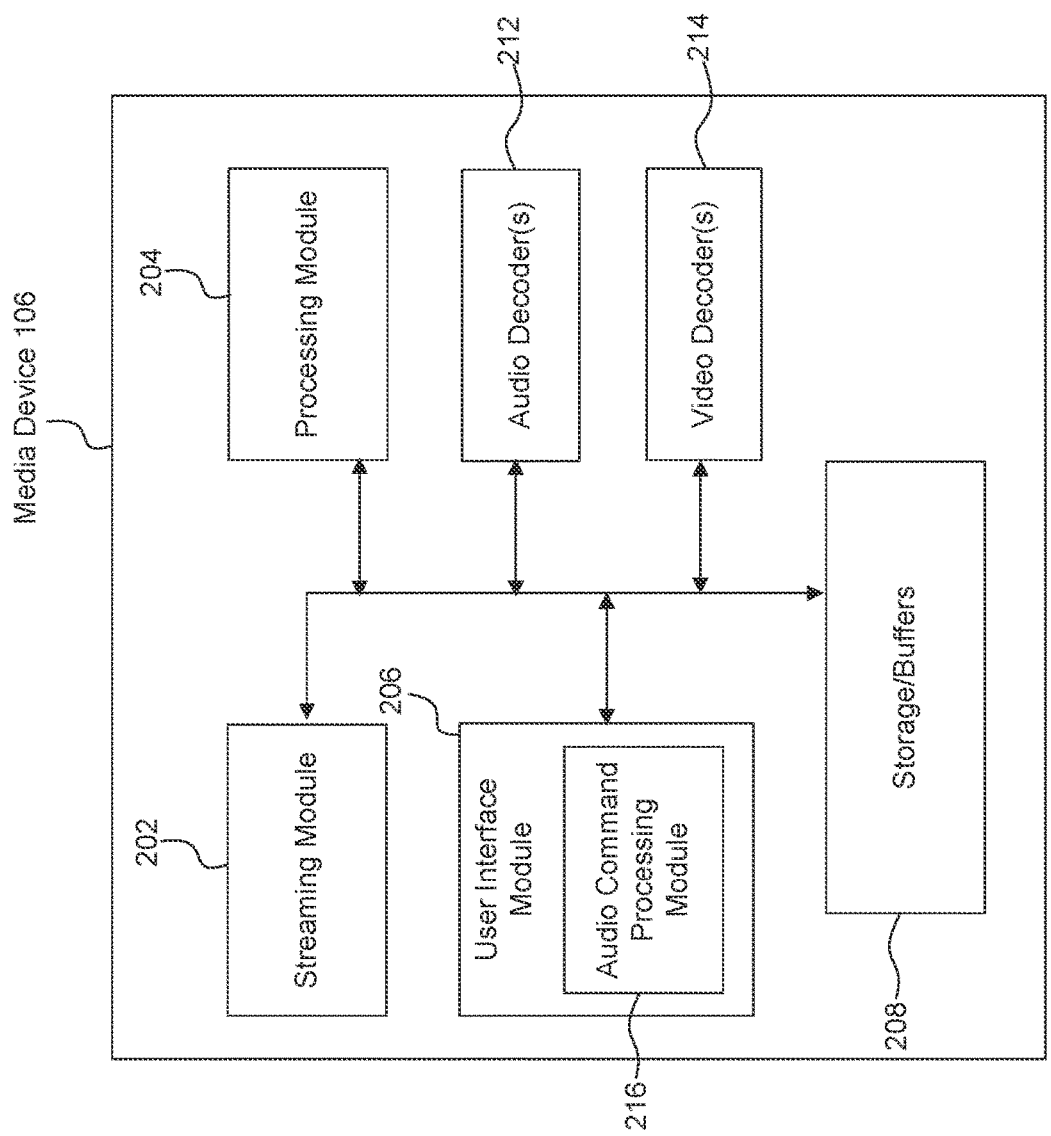
FIG. 2 illustrates a block diagram of a streaming media device, according to some embodiments.

In some embodiments, the audio data may be alternatively or additionally processed and analyzed by an audio command processing module 216 in media device 106 (see FIG. 2). Media device 106 and system servers 126 may then cooperate to pick one of the verbal commands or spoken queries to process (either the verbal command or spoken query recognized by audio command processing module 130 in system servers 126, or the verbal command or spoken query recognized by audio command processing module 216 in media device 106).

FIG. 2 illustrates a block diagram of an example media device 106, according to some embodiments. Media device 106 may include a streaming module 202, a processing module 204, storage/buffers 208, and a user interface module 206. User interface module 206 may be configured to present a search interface associated with personalized retrieval system 128 to user 132 via display device 108. As described above, user interface module 206 may include audio command processing module 216.

Media device 106 may also include one or more audio decoders 212 and one or more video decoders 214.

Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples.

Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmv, wma, asf), WEBM, FLV, AVI, QuickTime, HDV, MXF (OP1a, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, H.265, AVI, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

Now referring to both FIGS. 1 and 2, in some embodiments, user 132 may interact with media device 106 via, for example, remote control 110. For example, user 132 may use remote control 110 to interact with user interface module 206 of media device 106 to select a content item, such as a movie, TV show, music, book, application, game, etc. For example, user 132 may select a content item from among a list of content items generated by personalized retrieval system 128 based on query submitted by user 132, wherein the list is presented in a ranked order based on a predicted measure of relevancy to user 132. In response to the user selection, streaming module 202 of media device 106 may request the selected content item from content server(s) 120 over network 118. Content server(s) 120 may transmit the requested content item to streaming module 202. Media device 106 may transmit the received content item to display device 108 for playback to user 132.

In streaming embodiments, streaming module 202 may transmit the content item to display device 108 in real time or near real time as it receives such content item from content server(s) 120. In non-streaming embodiments, media device 106 may store the content item received from content server(s) 120 in storage/buffers 208 for later playback on display device 108.

Personalized Retrieval System

Figure 3:
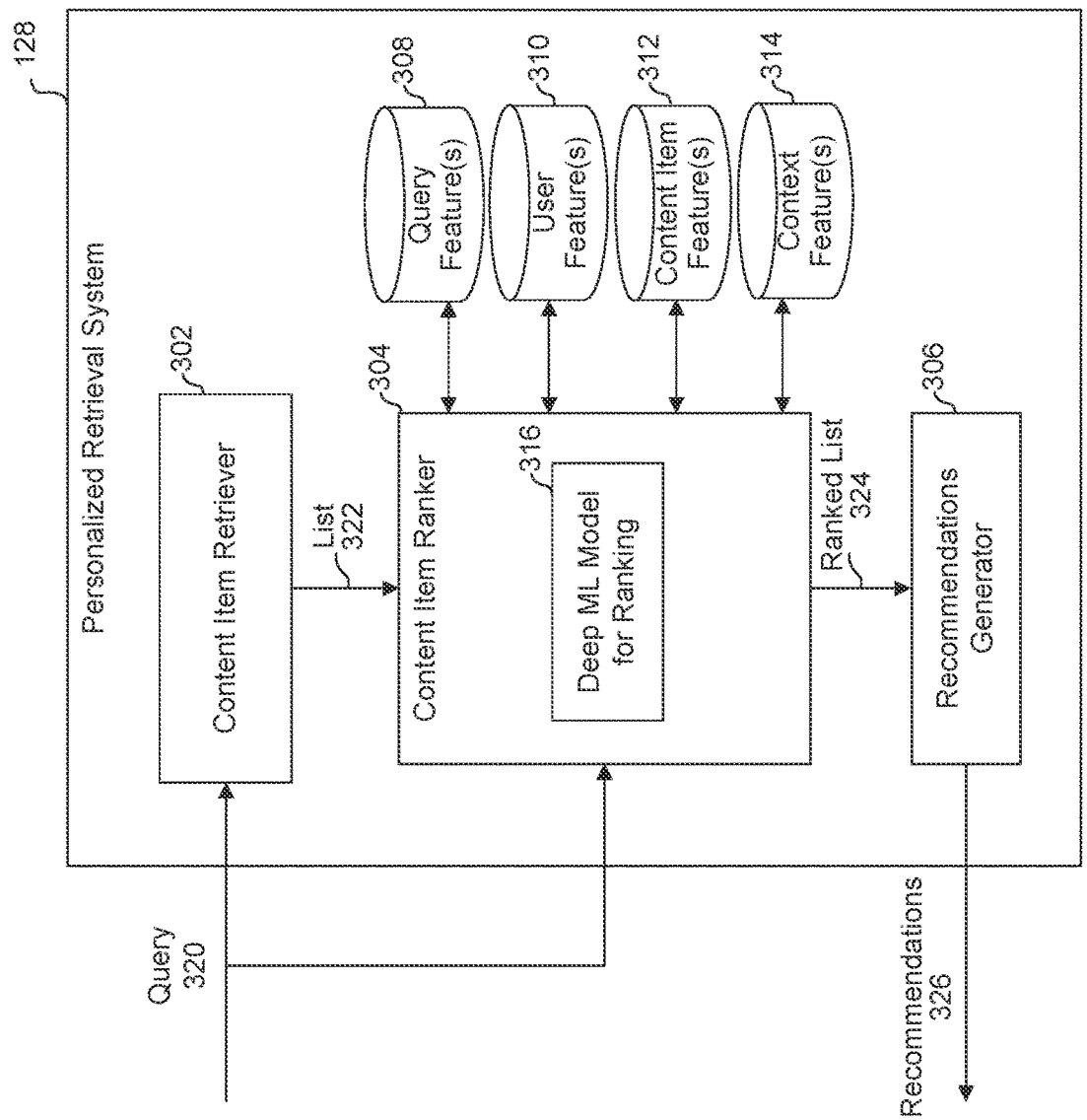
FIG. 3 illustrates a block diagram of a personalized retrieval system, according to some embodiments.

FIG. 3 illustrates a block diagram of personalized retrieval system 128, according to some embodiments. As noted above, personalized retrieval system 128 may be implemented by system server(s) 126 in multimedia environment 102 of FIG. 1. As also noted above, personalized retrieval system 128 may be accessed by user 132 via a search interface that is provided by media device 106 and displayed via display device 108. Personalized retrieval system 128 may comprise a deep ML model for ranking that operates to rank content items retrieved in response to submission of a query, wherein the ranking may be used to order the presentation of content item information to a user. In an embodiment, the deep ML model may rank content items based both on a predicted probability of a first type of user-item interaction between the user and the content item and a second predicted probability of a second type of user-item interaction between the user and the content item. Further details of the deep ML model for ranking and its use to generate an ordered list of search results will be provided herein.

As shown in FIG. 3, personalized retrieval system 128 comprises a content item retriever 302, a content item ranker 304, and a recommendations generator 306.

Content item retriever 302 is configured to receive a query 320 submitted by a user and, based at least on query 320, identify one or more content items stored by content server(s) 120 that are deemed relevant to query 320. As discussed above, user 132 may submit query 320 via a search interface associated with personalized retrieval system 128, wherein the search interface may be rendered to display device 108 by media device 106. In an embodiment, media device 106 may transmit a query to personalized retrieval system 128 each time user 132 enters a new query character into the search interface. Thus, in accordance with such an embodiment, query 320 may consist of a first character of a word or only the first few characters of a word, but not a complete word. However, this is only one example use case, and query 320 may also comprise any combination of words and/or characters.

Content item retriever 302 is configured to receive query 320 and identify a set of content items stored by content server(s) 120 that are deemed relevant to query 320. Content item retriever 302 is further configured to pass a list 322 that identifies the content items in the set to content item ranker 304.

Content item ranker 304 is configured to receive query 320 and list 322. Content item ranker 304 is further configured to calculate, based at least on query 320, a ranking score for each content item identified in list 322. Content item ranker 304 is still further configured to generate a ranked list 324 of the content items in which the items are ranked from highest ranking score to lowest ranking score, and to pass ranked list 324 to recommendations generator 306.

Recommendations generator 306 is configured to receive ranked list 324 and to generate recommendations 326 based thereon. Recommendations 326 may comprise, for example, information associated with each content item identified in ranked list 324 (e.g., a title of the content item, an icon or image associated with the content item, a content description associated with the content item, a link that activates playback of the content item, or the like). Such content item information may be organized for presentation in accordance with the order specified by ranked list 324. For example, recommendations 326 may comprise a list of content items sorted by ranking score, such that the content item with the highest ranking score is shown at a beginning or top of the list. Recommendations generator 306 is further configured to transmit recommendations 326 to media device 106. Media device 106 may present such information to user 132 via a search interface rendered to display device 108. In an embodiment, the search interface enables user 132 to interact with (e.g., click on) a first GUI control associated with each content item included within recommendations 326 to obtain additional information about the corresponding content item and/or a second GUI control associated with each content item included within recommendations 326 to play back (e.g., stream) the corresponding content item.

In certain scenarios, content item retriever 302 may identify a mix of both relevant and irrelevant content items based on query 320. For example, if query 320 is limited to only a very small number of characters, it is possible that content item retriever 302 will retrieve content items that have been determined to match the input character sequence but that are nevertheless irrelevant to user 132. As another example, due to a typographical error or misspelling in query 320, content item retriever 302 may retrieve content items that are irrelevant to user 132. Consequently, it is desirable that content item ranker 304 be able to rank the content items identified in list 322 by accurately predicting which of the content items are most relevant to the user and by sorting those items to the top of ranked list 324. This can assist user 132 in finding desired content items more quickly and easily. Furthermore, by enabling user 132 to quickly and easily find desired content items, content item ranker 304 can help user 132 avoid having to retrieve information about irrelevant items or submit multiple different queries to locate desired content items, thereby conserving resources of media device 106, system server(s) 126, and/or network 118. For example, computing resources (e.g., power, processor cycles, memory, or the like) of media device 106 and system server(s) 126 may be conserved and resources (e.g., bandwidth, switching operations, or the like) of network 118 may be conserved.

Accurately ranking retrieved content items based on a degree of relevancy to a user can be challenging, especially when relevancy must be predicted based on a relatively small number of query characters. To address this issue, an embodiment of content item ranker 304 includes a deep machine learning (ML) model for ranking 316 that accepts as input at least one or more query features 308 associated with query 320 and one or more content features 312 associated with a candidate content item on list 322. In certain embodiments, the input may also include one or more user features 310 associated with user 132. Based on such input, deep ML model for ranking 316 generates one or more measures of relevancy for the candidate content item, and content item ranker 304 utilizes the measure(s) of relevancy to calculate a ranking score for the particular content item. Content item ranker 304 operates in the foregoing manner to generate a ranking score for each content item on list 322 and then uses the ranking scores assigned to the content items to generate ranked list 324.

As will be described herein, deep ML model for ranking 316 may advantageously be trained to learn complex, non-linear relationships between queries and content items. This may allow deep ML model for ranking 316 to predict relevant content items for a user, even when the relationships between the query and the content items are not easily captured by simple algorithms. For example, with sufficient training, deep ML model for ranking 316 may be able to predict relevant content items for a user even when the query input is limited to just a few characters or when there are typographical errors or misspellings in the query.

Table 1 shows an example set of features that may be provided as input to deep ML model for ranking 316 in an embodiment in which the content items being ranked are recorded shows (e.g., movies, television shows, or the like).

TABLE 1

| Feature Name | Feature Type | Data Type |
| --- | --- | --- |
| profile_id | User feature | Categorical |
| device_id | User feature | Categorical |
| content_id | Content item feature | Categorical |
| content_type | Content item feature | Categorical |
| original_audio_language | Content item feature | Categorical |
| origin_country | Content item feature | Categorical |
| search_query | Query feature | Categorical |
| normalized_launches_7 days | Content item feature | Continuous |
| normalized_clicks_7 days | Content item feature | Continuous |
| ctr_combined | Content item/query feature | Continuous |
| long_watch_rate_combined | Content item/query feature | Continuous |

Profile_id may be an identifier of a user for whom the search is being performed, such as user 132. A single media device 106 may have multiple users thereof and each user thereof may be assigned a profile and associated profile ID. This enables personalized retrieval system 128 to distinguish between different users of the same media device 106.

However, profile_id may be generalized to any user ID that identifies a user of personal retrieval system 128.

Device_id may be an identifier of a device associated with the user for whom the search is being performed or a device from which query 320 was received. For example, device_id may comprise an identifier of media device 106 with which user 132 has interacted to submit query 320.

Content_id may be an identifier of the candidate content item (i.e., the content item to be ranked).

Content_type may be a categorical descriptor of the candidate content item. For example, content_type may specify whether the candidate content item is a movie or a television show, may specify a genre associated with the candidate content item, or the like.

Original_audio_language may be a categorical descriptor of a language in which the candidate content item was originally recorded.

Origin_country may be a categorical descriptor of a country of origin of the candidate content item. The country of origin may be the country in which the candidate content item was produced, although other factors may be used to determine the country of origin.

Search_query may be the query that was input by the user (e.g., query 320 submitted by user 132).

The features normalized_launches, normalized_clicks_7 days, ctr_combined and long_watch_rate_combined are all features that may be determined by tracking user interactions with personalized retrieval system 128 over time. For example, personalized retrieval system 128 may maintain logs of user interactions therewith over time and such logs may be analyzed to determine these features.

For example, in an embodiment, when a user submits a query to personalized retrieval system 128, the user may be shown a list of content items that may be relevant to the query. Each content item in the list may be represented by a name, image, or the like. The display of a content item representation to a user in this manner may be termed an "impression." A user may interact with a first GUI control associated with a content item in the list (e.g., by clicking on it) to cause a window, screen or other display area to be displayed that includes information about the content item. This user interaction may be termed a "click." The window, screen or display area may include a second GUI control (e.g., a "play" or "launch" button) that the user may interact with to cause the content item to be launched for playback. This user interaction may be termed a "launch." Personalized retrieval system 128 may be configured to record (e.g., in one or more logs) queries submitted by users, impressions delivered to users in response to such queries, user click interactions with content items resulting from such queries, user launch interactions with content items resulting from such queries, and an amount of time a user watched a content item following a launch interaction.

In view of this context, normalized_launches_7 days may be a normalized representation of a number of times that users have launched the candidate content item for playback over a predefined time period (e.g., the last 7 days).

Normalized_clicks 7 days may be a normalized representation of a number of times users have interacted with a GUI control associated with the candidate content item to obtain information about the candidate content item over a predefined time period (e.g., the last 7 days).

Ctr_combined may be a weighted sum of (i) a click through rate (CTR) for the candidate content item when such content item was presented in relation to a submission of the query and (ii) a CTR for the candidate content item when such content item was presented generally, wherein each CTR represents a number of times users have interacted with a GUI control associated with the candidate content item to obtain information about the candidate content item divided by a number of times the content item was presented to users. Since ctr_combined includes information that is specific to the query as well as to the candidate content item, ctr_combined may be considered a query feature as well as a content feature.

Long_watch_rate_combined may be a weighted sum of (i) a long watch rate for the candidate content item when such content item was presented in relation to a submission of the query and (ii) a long watch rate for the candidate content item when such content item was presented generally, wherein each long watch rate represents a number of times users have watched the candidate content item for longer than a predefined time period (e.g., 120 seconds). Since long_watch_rate_combined includes information that is specific to the query as well as to the candidate content item, long_watch_rate_combined may be considered a query feature as well as a content feature.

Table 2 shows an example set of features that may be provided as input to deep ML model for ranking 316 in an embodiment in which the content items being ranked are televised sporting events.

TABLE 2

| Feature Name | Feature Type | Data Type |
|---|---|---|
| league_primary_title | Content item feature | Categorical |
| search_query | Query feature | Categorical |
| row_id | Content item feature | Categorical |
| home_team_id | Content item feature | Categorical |
| away_team_id | Content item feature | Categorical |
| normalized_num_launch_snpsht | Content item feature | Continuous |
| normalized_num_select_snpsht | Content item feature | Continuous |
| normalized_query_league_title_dist | Content item/query feature | Continuous |
| normalized_query_home_title_dist | Content item/query feature | Continuous |
| normalized_query_away_title_dist | Content item/query feature | Continuous |
| normalized_time_to_event | Content item/query feature | Continuous |

League_primary_title may be a name or title of a sports league with which the candidate content item is associated.

Search_query may be the query that was input by the user (e.g., query 320 submitted by user 132).

Row_id may be an identifier of a row to which the candidate content item has been assigned in a GUI of personalized retrieval system 128, wherein the row assignment indicates that the candidate content item is either a live event or an upcoming event. For this reason, row_id may be generalized to a feature that classifies the candidate content item as either being a live event or an upcoming event.

Home_team_id may be an identifier of a home team associated with the candidate content item.

Away_team_id may be an identifier of an away team associated with the candidate content item.

Normalized_num_launch_snpsht may be a normalized representation of a number of times that users have launched the content item for playback over a predefined time period (e.g., the last 10 minutes).

Normalized_num_select_snpsht may be a normalized representation of a number of times users have interacted with a GUI control associated with the candidate content item to obtain information about the candidate content item over a predefined time period (e.g., the last 10 minutes).

Normalized_query_league_title_dist may be a normalized representation of a measure of similarity between the query and the sports league title associated with the candidate content item. The measure of similarity may be determined, for example, using Levenshtein distance or other suitable string similarity metric. Since normalized_query_league_title_dist includes information that is specific to the query as well as information that is specific to the content item, normalized_query_league_title_dist may be considered a query feature as well as a content feature.

Normalized_query_home_title_dist may be a normalized representation of a measure of similarity between the query and the name of the home team associated with the candidate content item. The measure of similarity may be determined, for example, using Levenshtein distance or other suitable string similarity metric. Since normalized_query_home_title_dist includes information that is specific to the query as well as information that is specific to the content item, normalized_query_home_title_dist may be considered a query feature as well as a content feature.

Normalized_query_away_title_dist may be a normalized representation of a measure of similarity between the query and the name of the away team associated with the candidate content item. The measure of similarity may be determined, for example, using Levenshtein distance or other suitable string similarity metric. Since normalized_query_away_title_dist includes information that is specific to the query as well as information that is specific to the content item, normalized_query_away_title_dist may be considered a query feature as well as a content feature.

Normalized_time_to_event may be a normalized representation of an amount of time until a start time associated with the candidate content item.

In embodiments, content item ranker 304 may obtain or derive user feature(s) 310 that are input to deep ML model for ranking 316 from user information stored in a user information data store (not shown in FIG. 3). Content item retriever 302 may be capable of identifying a user associated with query 320 (e.g., user 132) in a variety of ways and then obtain the relevant user information associated with the identified user from the user information data store. For example, query 320 may be transmitted from media device 106 along with a user ID, user profile ID, device ID, network address (e.g., IP address) and/or other information that can be used by content item ranker 304 to identify a user associated with query 320. In alternate embodiments, content item ranker 304 may obtain or derive user feature(s) 310 solely from information received with query 320.

In embodiments, content item ranker 304 may obtain or derive content item feature(s) 312 that are input to deep ML model for ranking 316 from content item information stored in a content item information data store (not shown in FIG. 3). The content item information may include metadata 124 as previously described in reference to FIG. 1. The content item information may also include statistics about content items derived from user interaction logs as previously described.

In embodiments, content item ranker 304 may use different feature sets as input to deep ML model for ranking 316, wherein the feature set used is based upon a type of content that is being searched. Thus, for example, content item ranker 304 may be configured to use the feature set discussed above in reference to Table 1 when ranking content items as part of a search for a recorded show and use the feature set discussed above in reference to Table 2 when ranking content items as part of a search for a televised sporting event. It has been observed that different feature sets may provide better results for different content types. For example, televised sporting events may be ephemeral, and thus there may be not be a long history of user interactions from which to generate features. Unlike movies and television shows, televised sporting events typically have a short lifespan and are not watched repeatedly. Consequently, various features listed in Table 2 are associated with individual sports teams as opposed to a particular item of content. This is because a user's interest in a team is likely to be more enduring than their interest in a particular game or match.

The feature sets discussed above in reference to Table 1 and Table 2 have been presented herein by way of example only. The input to deep ML model for ranking 316 may include query features, content item features and/or user features other than those shown in Tables 1 and 2. Furthermore, certain features relating to a context of the submission of query 320 (e.g., a time of day or date associated with submission of query 320) may be provided as input to deep ML model for ranking 316 in accordance with embodiments.

Figure 4:
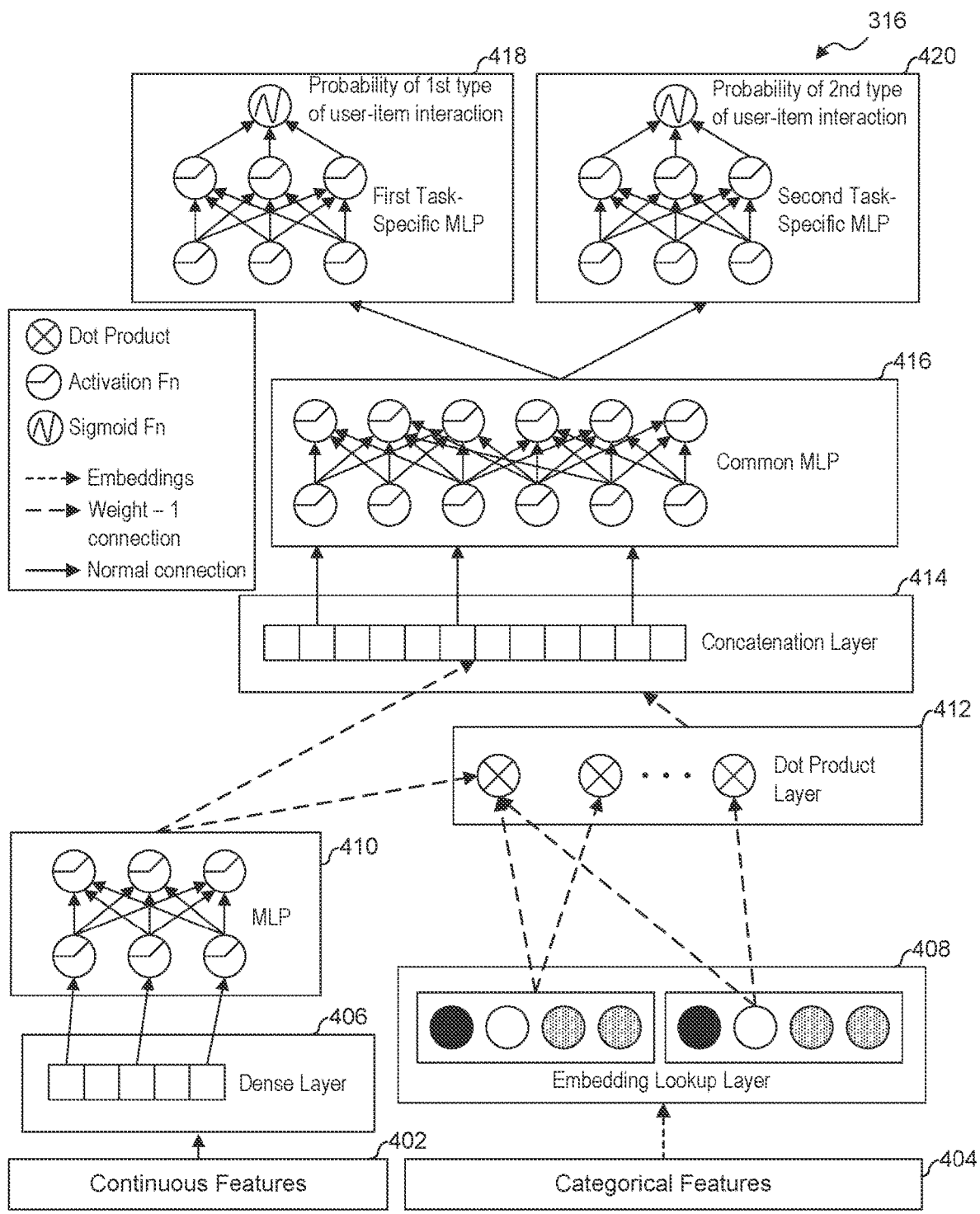
FIG. 4 illustrates a block diagram of a deep ML model used to rank a plurality of content items for presentation to a user in response to submission of a query, according to some embodiments.

FIG. 4 illustrates a block diagram of deep ML model for ranking 316, according to some embodiments. The embodiment of deep ML model for ranking 316 shown in FIG. 4 is a modified version of the deep learning recommendation model (DLRM) described in M. Naumov, et al., "Deep Learning Recommendation Model for Personalization and Recommendation Systems," CoRR, vol. abs/1906.00091 (2019), the entirety of which is incorporated by reference herein. The implementation shown in FIG. 4 differs from DLRM in that it has been extended to include two separate multi-layer perceptrons (MLPs) at the output of the model, thereby enabling the model to learn to predict a probability of two different types of user-item interactions. In an embodiment, the first type of user-item interaction comprises a user launching a content item for playback and the second type of user-item interaction comprises a user interacting with a user interface (UI) control associated with the content item to obtain information about the content item. Since both types of user-item interactions can be indicative of a successful search, deep ML model for ranking 316 is advantageously adapted to generate a probability for each type. Consequently, both probabilities may be considered when calculating a ranking score for a content item.

As shown in FIG. 4, deep ML model for ranking 316 receives as input a set of continuous features 402 and a set of categorical features 404. For example, continuous features 402 may comprise the continuous features shown in Table 1 (i.e., normalized_launches_7 days, normalized_clicks_7 days, ctr_combined, and long_watch_rate_combined) and categorical features 404 may comprise the categorical features shown in Table 1 (i.e., profile_id, device_id, content_id, content_type, original_audio_language, origin_country, and search_query). As another example, continuous features 402 may comprise the continuous features shown in Table 2 (i.e., normalized_num_launch_snpsht, normalized_num_select_snpsht, normalized_query_league_title_dist, normalized_query_home_title_dist, normalized_query_away_title_dist, and normalized_time_to_event) and categorical features 404 may comprise the categorical features shown in Table 2 (i.e., league_primary_title, search_query, row_id, home_team_id, and away_team_id). However, these are only examples, and other features and/or additional features may be provided as input to deep ML model for ranking 316.

To process categorical features 404, deep ML model for ranking 316 includes an embedding lookup layer 408 that maps each categorical feature to an embedding vector of the same dimension. An embedding vector is a dense representation of a categorical feature in an abstract space. The mapping of a categorical feature to an embedding vector may comprise mapping the value of the categorical feature to a corresponding row vector of an embedding table, when the values of the row vectors are learned during training of deep ML model for ranking 316.

In an embodiment, a hash function may be applied to a value of a categorical feature to determine a corresponding row vector. Such an approach may be adopted when dealing with high-cardinality features (i.e., features with many categories) because it enables the values of such features to be mapped to a lower-dimensional space. This is useful because many ML algorithms cannot handle high-cardinality features directly, and the hashing approach allows these features to be used while still maintaining an acceptable level of performance. One possible disadvantage of the hashing approach is that it can potentially result in collisions, whereby different categorical feature values are mapped to the same hash value. This can degrade the performance of the ML model.

To address this issue, in an embodiment, embedding lookup layer 408 maps each one of categorical features 404 to a plurality of different embedding vectors using a corresponding plurality of hash functions. For example, in an embodiment, embedding lookup layer 408 may map each one of categorical features 404 to two different embedding vectors using two different hash functions (e.g., a MurmurHash non-cryptographic hash function with two different seed values). This can help reduce possible performance degradation due to the above-mentioned collision problem.

To process continuous features 402, deep ML model for ranking 316 includes a dense layer 406 that stores a dense representation of continuous features 402 and an MLP 410 that processes such dense representation to generate an output vector of the same length as the aforementioned embedding vectors.

Deep ML model for ranking 316 computes second-order interaction of the different features explicitly. This is done using a dot product layer 412 that takes the dot product between all pairs of embedding vectors from embedding lookup layer 408 and processed dense features from MLP 410 as expressed by the formula shown below:

$$\hat{y}(x) := w_0 + \sum_{i=0}^{n} w_i x_i + \sum_{i=1}^{n} \sum_{j=i+1}^{n} \langle v_i v_j \rangle x_i x_j$$

The dot products from dot product layer 412 are then concatenated with the original processed dense features from MLP 410 by a concatenation layer 414. The output of the concatenation layer is post-processed by a common MLP 416. The output of common MLP 416 is further processed by a first task-specific MLP 418 and fed into a first sigmoid function to calculate a probability of a first type of user-item interaction (e.g., a user launching the content item for playback). The output of common MLP 416 is also processed by a second task-specific MLP 420 and fed into a second sigmoid function to calculate a probability of a second type of user-item interaction (e.g., a user interacting with a UI control associated with the content item to obtain information about the content item).

In embodiments, content item ranker 304 may generate a ranking score for a candidate content item based at least on the probability generated by first task-specific MLP 418 and the probability generated by second task-specific MLP 420. For example, in embodiments, content item ranker 304 may calculate an average of the two probabilities and use the result as the ranking score. In other embodiments, content item ranker 304 may calculate a weighted average of the two probabilities and use the result as the ranking score. In such embodiments, the weight assigned to each probability may be determined via offline or online learning. However, these are only examples, and still other methods of determining the ranking score based at least on the two probabilities may be used.

Although FIG. 4 depicts one example architecture of deep ML model for ranking 316, it is to be understood that this is an example only and is by no means limiting. Other multi-output deep ML model architectures may be used to implement deep ML model for ranking 316. For example, multi-output versions of Wide and Deep, Deep and Cross, DeepFM and xDeepFM networks may be used in accordance with different embodiments.

Furthermore, although deep ML model for ranking 316 is described as generating a probability of a launch/play interaction and a probability of a "click" interaction (e.g., a user interacting with a UI control to obtain information about a content item), this is an example only and is not intended to be limiting. Deep ML model for ranking 316 may be trained to predict other types of user-item interactions, such as impressions, hovering, favoriting, recommending, or the like. Additionally, deep ML model for ranking 316 may be designed and trained to generate probabilities for more than two types of user-item interactions.

It should be noted that, although embodiments described herein use deep ML model for ranking 316 to generate ranking scores for content items, the model may generally be applied to generate ranking scores for any type of item. Furthermore, although deep ML model for ranking 316 is described herein as being used for item ranking, the model may also be used for item retrieval. For example, content item retriever 302 may use deep ML model for ranking 316 to identify items for inclusion in list 322.

Figure 5:
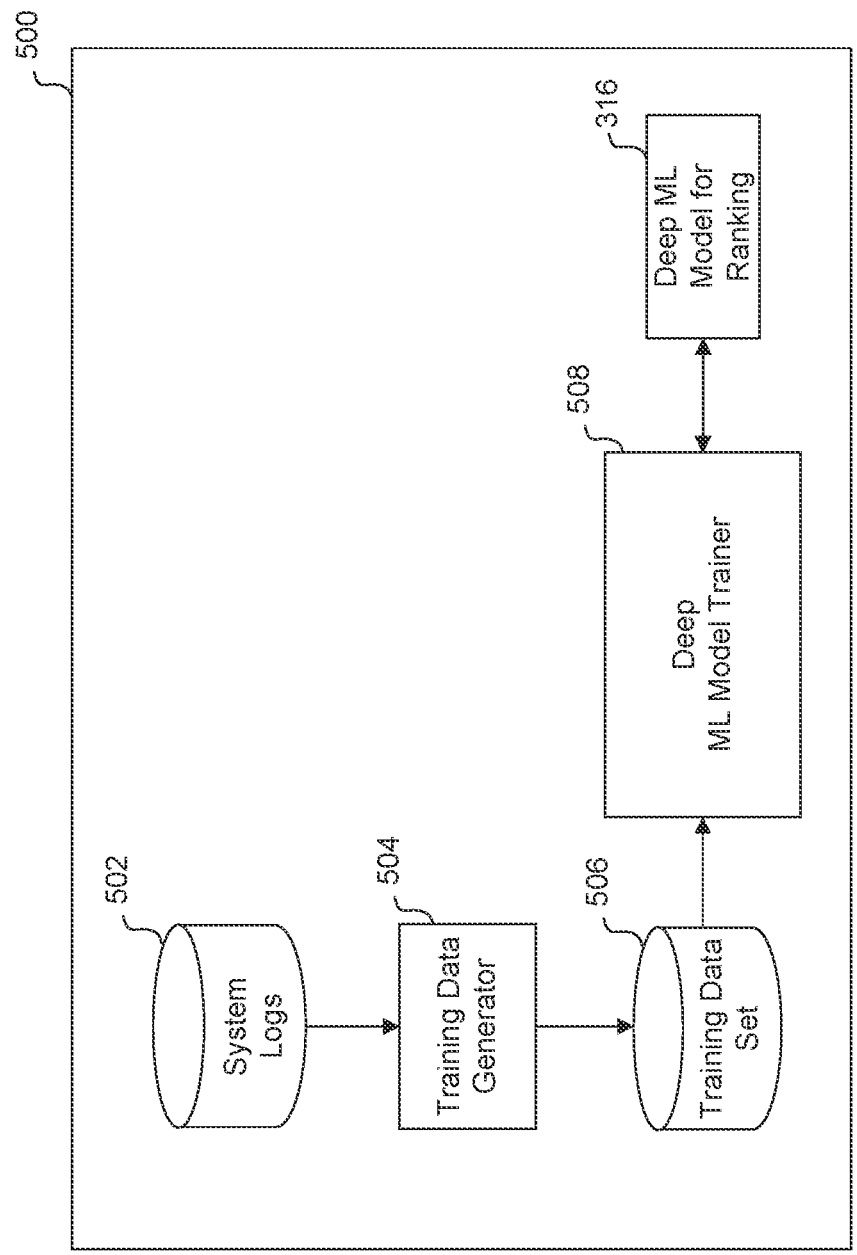
FIG. 5 illustrates a block diagram of a system for training a deep ML model, according to some embodiments.

FIG. 5 illustrates a block diagram of a system 500 for training deep ML model for ranking 316, according to some embodiments. System 500 includes a deep ML model trainer 508. Deep ML model trainer 508 is configured to utilize a training data set 506 to train deep ML model for ranking 316. In embodiments, this process entails modifying parameters (e.g., weights) associated with certain elements of deep ML model for ranking 316 based on training data set 506. For example, in an embodiment, this process entails modifying weights associated with dense layer 406, embedding lookup layer 408, MLP 410, common MLP 416, first task-specific MLP 418, and second task-specific MLP 420 of deep ML model for ranking 316 based on training data set 506.

System 500 may further include a training data generator 504 that is configured to generate some or all of training data set 506 based on data derived from system logs 502 that record previously-submitted queries and an indication of whether the submission of such queries led to one or more user-content item interactions. Such user-item content interactions may include, for example, a user being shown a representation of or information about a content item (which may be referred to as an "impression"), a user clicking on or otherwise interacting with a GUI control to obtain information about a content item, or a user playing a content item.

In embodiments, training data generator 504 is configured to extrapolate from data in system logs 502 to generate additional training records in training data set 506. In accordance with such embodiments, when training data generator 504 determines that a query comprising a sequence of characters is associated with a prior user interaction with a particular content item, training data generator 504 may generate a separate training record for each contiguous subsequence of characters in the sequence of characters that starts with a first character in the sequence of characters, wherein each training record associates the corresponding contiguous subsequence with the prior user interaction with the particular candidate item.

By way of example, assume that training data generator determines, based on data stored in system logs 502, that a user previously typed the query "find" and based on recommendations received from personalized retrieval system 128, played the movie "Finding Nemo". Assuming that this is a system in which a query is submitted each time the user types in a character, then the user may have previously submitted the queries "f", "fi", and "fin" with the intention of watching "Finding Nemo", but system logs 502 may only reflect the relationship between the query "find" and the movie "Finding Nemo" for that user. For example, the user may only have been shown the content item "Finding Nemo" based on the query "find", but not based on the prior queries "f", "fi", and "fin", and thus could only interact with that content item after typing "find".

Consequently, in embodiments, training data generator 504 will operate to enrich the training data for this user by creating a separate training record for each contiguous subsequence of characters in the sequence of characters "find" that starts with the first character "f" in the sequence of characters. In other words, training data generator 504 will create a separate training record for each of the following contiguous subsequences of "find": "f", "fi", "fin" and "find", wherein each training record will associate a respective one of the contiguous subsequences with the user-content item interaction of the user watching "Finding Nemo". Such enrichment of training data set 506 to reflect user intent by training data generator 504 can improve the performance of deep ML model for ranking 316 by enabling the model to identify relevant content items for users based on fewer query input characters.

In embodiments, deep ML model trainer 508 trains deep ML model for ranking 316 by modifying parameters (e.g., weights) of the model through backpropagation based on examples in training data set 506 in a manner that minimizes a particular loss function. In one particular embodiment, the loss function comprises a plurality of terms including a first term that represents categorical cross entropy for multiple candidate classification, a second term that represents binary cross entropy to predict probability of a first type of user-item interaction, and a third term that optimizes binary cross entropy to predict probability of a second type of user-item interaction. In embodiments, the first type of user-item interaction may comprise a user clicking on or otherwise interacting with a GUI control to obtain information about a content item, and the second type of user-item interaction may comprise a user playing a content item. However, this is only an example and different loss functions may be used to train deep ML model for ranking 316.

Figure 6:
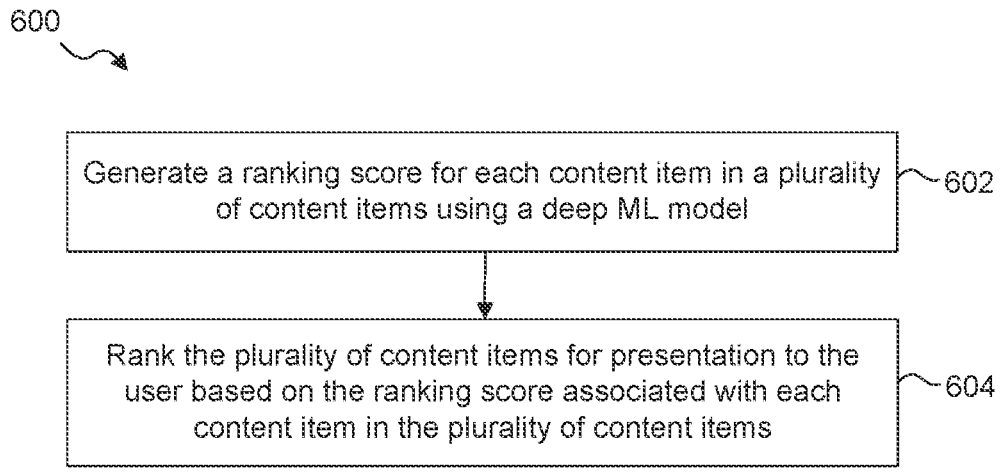
FIG. 6 illustrates a flow diagram of a method for ranking a plurality of content items for presentation to a user in response to a submission of a query, according to some embodiments.

FIG. 6 is a flow diagram for a method 600 for ranking a plurality of content items for presentation to a user in response to a submission of a query, according to some embodiments. Method 600 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 6, as will be understood by a person of ordinary skill in the art.

Method 600 shall be described with reference to FIG. 3. However, method 600 is not limited to that example embodiment.

In 602, content item ranker 304 generates a ranking score for each content item in a plurality of content items using a deep ML model. For example, in embodiments, content ranker 304 generates a ranking score for each content item identified in list 322 provided by content item retriever 302 using deep ML model for ranking 316.

In 604, context item ranker 304 ranks the plurality of content items for presentation to the user based on the ranking score associated with each content item in the plurality of content items. For example, in embodiments, content item ranker 304 ranks the plurality of content items in list 322 based on the ranking scores generated in 602 to generate ranked list 324 of content items. In further embodiments, recommendations generator 306 generates recommendations 326 that include a list of the content items from ranked list 324 sorted by ranking score, such that the content item with the highest ranking score is shown at a beginning or top of the list, and sends recommendations 326 to media device 106. Media device 106 may present such information to user 132 via a search interface rendered to display device 108. It is to be understood that "presenting content items to a user" may entail presenting information about content items to a user, presenting representations (e.g., names, images or the like) of content items to a user, or the like, without actually playing the content items.

Figure 7:
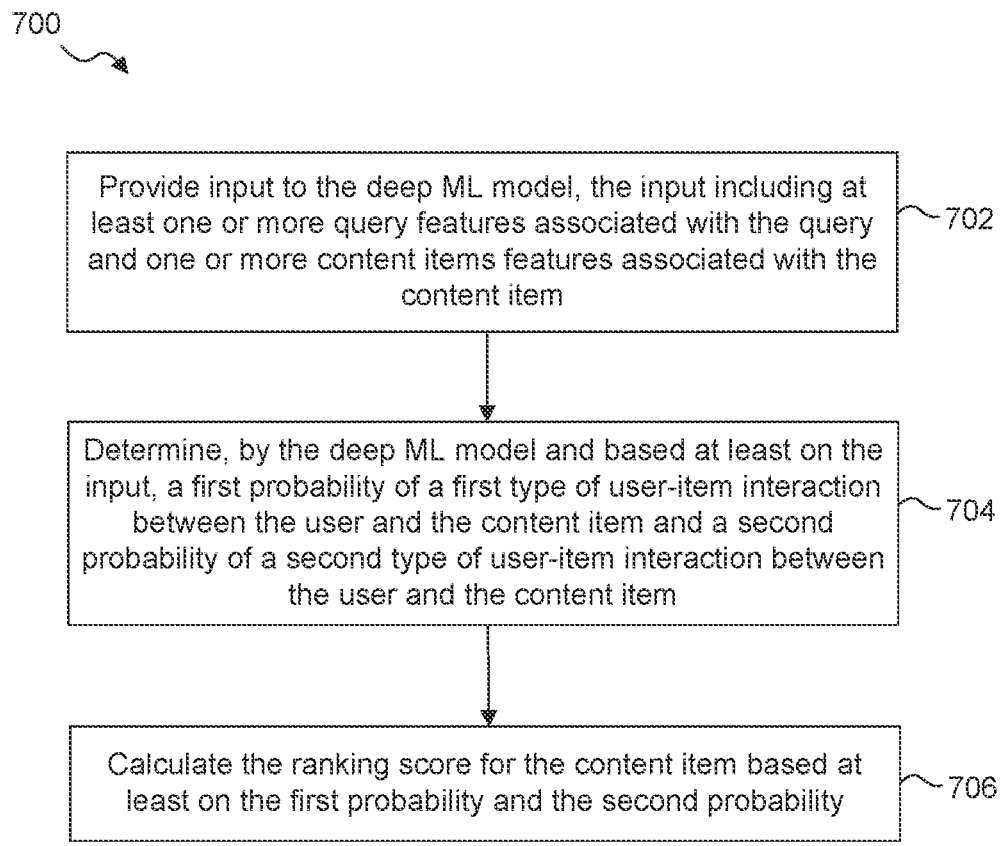
FIG. 7 illustrates a flow diagram of a method for calculating a ranking score for each content item in a plurality of content items, according to some embodiments.

FIG. 7 is a flow diagram of a method 700 for calculating a ranking score for each content item in a plurality of content items, according to some embodiments. Method 700 may be used to implement 602 of method 600, according to some embodiments. Method 700 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 7, as will be understood by a person of ordinary skill in the art.

Method 700 shall be described with reference to FIGS. 3 and 4. However, method 700 is not limited to that example embodiment.

In 702, content item ranker 304 provides input to deep ML model for ranking 316, wherein the input includes at least one or more query features 308 associated with the query and one or more content item features 312 associated with a candidate content item. As noted above, the input may also include one or more user features 310 and/or one or more context features 314.

In 704, deep ML model for ranking 316 determines, based at least on the input, a first probability of a first type of user-item interaction between the user and the candidate content item and a second probability of a second type of user-item interaction between the user and the candidate content item. For example, as discussed above, deep ML model for ranking 316 may determine, based at least on the input provided thereto in 702, a probability of user 132 launching/playing the candidate content item (e.g., output by first task-specific MLP 418 of deep ML model for ranking 316) and a probability of user 132 interacting with a UI control associated with the candidate content item to obtain information about the candidate content item (e.g., output by second task-specific MLP 420 of deep ML model for ranking 316).

In 706, content item ranker 304 calculates the ranking score for the candidate content item based at least on the first probability and the second probability. For example, as discussed above, content item ranker 304 may calculate the ranking score for the candidate content item by computing an unweighted or weighted average of the two probabilities determined in 704. However, this is only an example, and other techniques may be used to calculate the ranking score based at least on the first probability and the second probability.

Example Computer System

Figure 8:
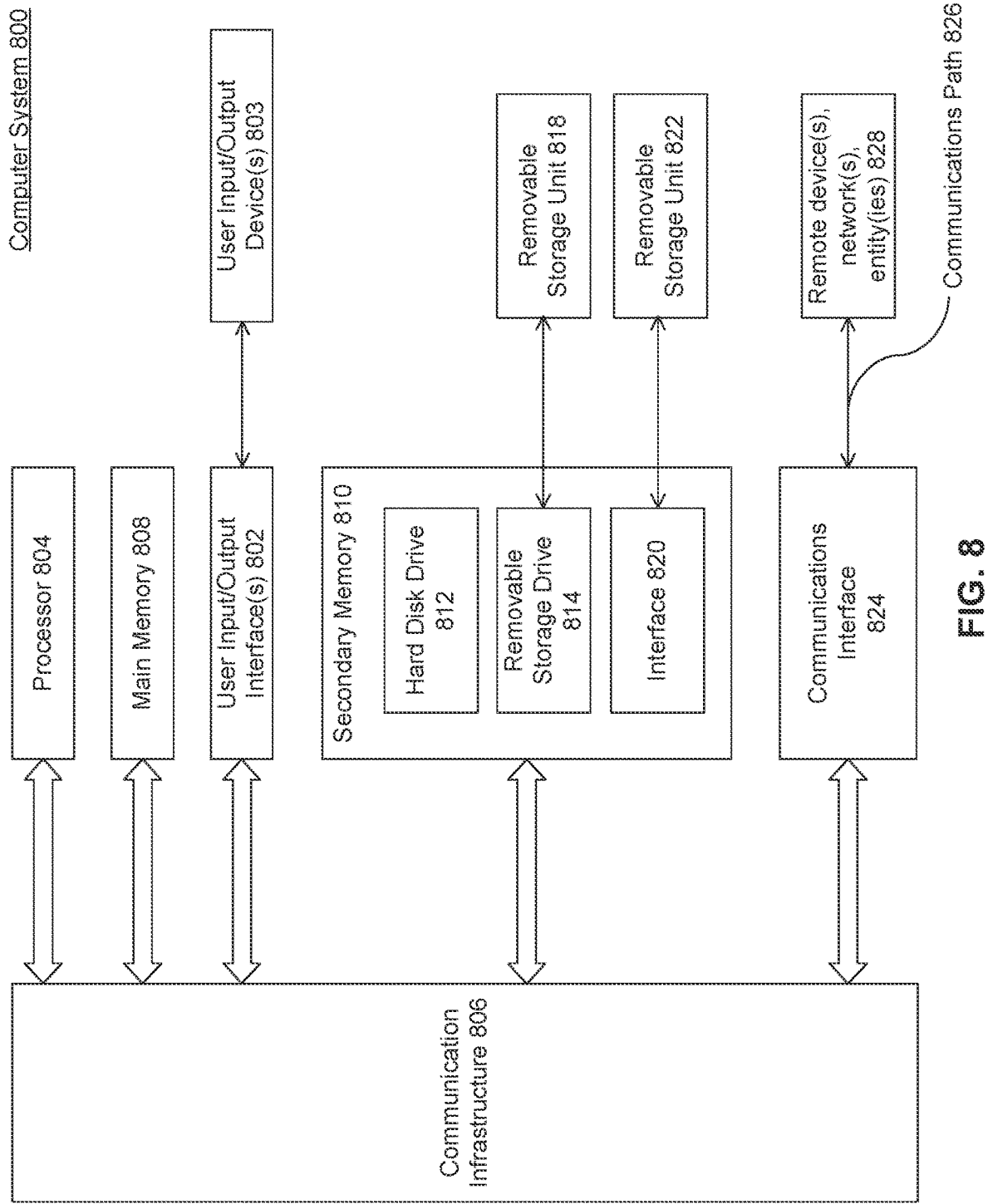
FIG. 8 illustrates an example computer system useful for implementing various embodiments.

Various embodiments may be implemented, for example, using one or more well-known computer systems, such as computer system 800 shown in FIG. 8. For example, one or more of media device 106, remote control 110, content server(s) 120, system server(s) 126, personalized retrieval system 128, or deep ML model for ranking 316 may be implemented using combinations or sub-combinations of computer system 800. Also or alternatively, one or more computer systems 800 may be used, for example, to implement any of the embodiments discussed herein, as well as combinations and sub-combinations thereof.

Computer system 800 may include one or more processors (also called central processing units, or CPUs), such as a processor 804. Processor 804 may be connected to a communication infrastructure or bus 806.

Computer system 800 may also include user input/output device(s) 803, such as monitors, keyboards, pointing devices, etc., which may communicate with communication infrastructure 1106 through user input/output interface(s) 802.

One or more of processors 804 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 800 may also include a main or primary memory 808, such as random access memory (RAM). Main memory 808 may include one or more levels of cache. Main memory 808 may have stored therein control logic (i.e., computer software) and/or data.

Computer system 800 may also include one or more secondary storage devices or memory 810. Secondary memory 810 may include, for example, a hard disk drive 812 and/or a removable storage device or drive 814. Removable storage drive 814 may be a floppy disk drive, a magnetic tape drive, a compact disk drive, an optical storage device, tape backup device, and/or any other storage device/drive.

Removable storage drive 814 may interact with a removable storage unit 818. Removable storage unit 818 may include a computer usable or readable storage device having stored thereon computer software (control logic) and/or data. Removable storage unit 818 may be a floppy disk, magnetic tape, compact disk, DVD, optical storage disk, and/any other computer data storage device. Removable storage drive 814 may read from and/or write to removable storage unit 818.

Secondary memory 810 may include other means, devices, components, instrumentalities or other approaches for allowing computer programs and/or other instructions and/or data to be accessed by computer system 800. Such means, devices, components, instrumentalities or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 800 may further include a communication or network interface 824. Communication interface 824 may enable computer system 800 to communicate and interact with any combination of external devices, external networks, external entities, etc. (individually and collectively referenced by reference number 828). For example, communication interface 824 may allow computer system 800 to communicate with external or remote devices 828 over communications path 826, which may be wired and/or wireless (or a combination thereof), and which may include any combination of LANs, WANs, the Internet, etc. Control logic and/or data may be transmitted to and from computer system 800 via communication path 826.

Computer system 800 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 800 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 800 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 800, main memory 808, secondary memory 810, and removable storage units 818 and 822, as well as tangible articles of manufacture embodying any combination of the foregoing. Such control logic, when executed by one or more data processing devices (such as computer system 800 or processor(s) 804), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 8. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for ranking a plurality of content items for presentation to a user in response to a submission of a query, comprising:
   generating, by at least one computer processor, a ranking score for each content item in the plurality of content items, wherein the generating the ranking score comprises, for each content item of the plurality of content items:
   providing input to a deep machine learning (ML) model, the input including at least one or more query features associated with the query and one or more content item features associated with the content item;
   mapping, by the deep ML model, each of the one or more query features to a plurality of embedding vectors using a corresponding plurality of hash functions, each of the embedding vectors being of a dimension;
   processing, by a first multi-layer perceptron (MLP) of the deep ML model, a representation of the one or more content item features to generate processed content item features each as a vector of the dimension;

computing, by the deep ML model, dot products between all pairs of the embedding vectors and the processed content item features;

concatenating, by the deep ML model, the dot products with processed content item features to provide concatenated features;

post-processing, with a second MLP of the deep ML model, the concatenated features to provide post-processed concatenated features;

determining, by a third MLP of the deep ML model and based at least on the post-processed concatenated features, a first probability of a first type of user-item interaction between the user and the content item, wherein the first type of interaction between the user and the content item comprises the user launching the content item for playback;

determining, by a fourth MLP of the deep ML model and based at least on the post-processed concatenated features, a second probability of a second type of user-item interaction between the user and the content item, wherein the second type of interaction between the user and the content item comprises the user interacting with a user interface (UI) control associated with the content item to obtain information about the content item; and calculating the ranking score for the content item based at least on the first probability and the second probability; and ranking the plurality of content items for presentation to the user based on the ranking score associated with each content item in the plurality of content items.

2. The computer-implemented method of claim 1, wherein the input further includes one or more user features associated with the user.

3. The computer-implemented method of claim 1, wherein the plurality of content items comprise a plurality of recorded shows, and wherein the one or more content item features associated with the content item comprise one or more of:

a content item identifier (ID) associated with the content item;

a content type associated with the content item;

an audio language associated with the content item;

an origin country associated with the content item;

a normalized representation of a number of times that a plurality of users have launched the content item for playback over a first predefined time period;

a normalized representation of a number of times that the plurality of users have interacted with the UI control associated with the content item to obtain information about the content item over a second predefined time period;

a weighted sum of (i) a click through rate (CTR) for the content item when the content item was presented in relation to a submission of the query and (ii) a CTR for the content item when the content item was presented generally, wherein each CTR represents a number of times the plurality of users have interacted with the UI control associated with the content item to obtain information about the content item divided by a number of times the content item was presented to the plurality of users; or a weighted sum of (i) a long watch rate for the content item when the content item was presented in relation to a submission of the query and (ii) a long watch rate for the content item when the content item was presented generally, wherein each long watch rate represents a number of times the plurality of users watched the content item for longer than a third predefined time period.

4. The computer-implemented method of claim 1, wherein the plurality of content items comprise a plurality of televised sporting events, and wherein the one or more content item features associated with the content item comprise one or more of:

a sports league title associated with the content item;

a live event or upcoming event classification associated with the content item;

an identifier (ID) of a home team associated with the content item;

an ID of an away team associated with the content item;

a normalized representation of a number of times that a plurality of users have launched the content item for playback over a first predefined time period;

a normalized representation of a number of times that the plurality of users have interacted with the UI control associated with the content item to obtain information about the content item over a second predefined time period;

a normalized representation of a measure of similarity between the query and the sports league title associated with the content item;

a normalized representation of a measure of similarity between the query and a name of the home team associated with the content item;

a normalized representation of a measure of similarity between the query and a name of the away team associated with the content item; or a normalized representation of an amount of time to a start time associated with the content item.

5. The computer-implemented method of claim 1, wherein the deep ML model comprises a modified version of a deep learning recommendation model (DLRM).

6. The computer-implemented method of claim 1, wherein the mapping comprises mapping each one of the one or more query features to two different embedding vectors using two different hash functions.

7. The computer-implemented method of claim 6, wherein the mapping uses a MurmurHash non-cryptographic hash function with two different seed values.

8. A system for ranking a plurality of content items for presentation to a user in response to a submission of a query, comprising:

one or more memories; and at least one processor each coupled to at least one of the memories and configured to perform operations comprising:

generating a ranking score for each content item in the plurality of content items, wherein the generating the ranking score comprises, for each content item of the plurality of content items:

providing input to a deep machine learning (ML) model, the input including at least one or more query features associated with the query and one or more content item features associated with the content item;

mapping, by the deep ML model, each of the one or more query features to a plurality of embedding vectors using a corresponding plurality of hash functions, each of the embedding vectors being of a dimension;

processing, by a first multi-layer perceptron (MLP) of the deep ML model, a representation of the one or more content item features to generate processed content item features each as a vector of the dimension;

computing, by the deep ML model, dot products between all pairs of the embedding vectors and the processed content item features;

concatenating, by the deep ML model, the dot products with processed content item features to provide concatenated features;

post-processing, with a second MLP of the deep ML model, the concatenated features to provide post-processed concatenated features;

determining, by a third MLP of the deep ML model and based at least on the post-processed concatenated features, a first probability of a first type of user-item interaction between the user and the content item, wherein the first type of interaction between the user and the content item comprises the user launching the content item for playback;

determining, by a fourth MLP of the deep ML model and based at least on the post-processed concatenated features, a second probability of a second type of user-item interaction between the user and the content item, wherein the second type of interaction between the user and the content item comprises the user interacting with a user interface (UI) control associated with the content item to obtain information about the content item;

calculating the ranking score for the content item based at least on the first probability and the second probability; and ranking the plurality of content items for presentation to the user based on the ranking score associated with each content item in the plurality of content items.

9. The system of claim 8, wherein the input further includes one or more user features associated with the user.

10. The system of claim 8, wherein the plurality of content items comprise a plurality of recorded shows, and wherein the one or more content item features associated with the content item comprise one or more of:

a content item identifier (ID) associated with the content item;

a content type associated with the content item;

an audio language associated with the content item;

an origin country associated with the content item;

a normalized representation of a number of times that a plurality of users have launched the content item for playback over a first predefined time period;

a normalized representation of a number of times that the plurality of users have interacted with the UI control associated with the content item to obtain information about the content item over a second predefined time period;

a weighted sum of (i) a click through rate (CTR) for the content item when the content item was presented in relation to a submission of the query and (ii) a CTR for the content item when the content item was presented generally, wherein each CTR represents a number of times the plurality of users have interacted with the UI control associated with the content item to obtain information about the content item divided by a number of times the content item was presented to the plurality of users; or a weighted sum of (i) a long watch rate for the content item when the content item was presented in relation to a submission of the query and (ii) a long watch rate for the content item when the content item was presented generally, wherein each long watch rate represents a number of times the plurality of users watched the content item for longer than a third predefined time period.

11. The system of claim 8, wherein the plurality of content items comprise a plurality of televised sporting events, and wherein the one or more content item features associated with the content item comprise one or more of:

a sports league title associated with the content item;

a live event or upcoming event classification associated with the content item;

an identifier (ID) of a home team associated with the content item;

an ID of an away team associated with the content item;

a normalized representation of a number of times that a plurality of users have launched the content item for playback over a first predefined time period;

a normalized representation of a number of times that the plurality of users have interacted with the UI control associated with the content item to obtain information about the content item over a second predefined time period;

a normalized representation of a measure of similarity between the query and the sports league title associated with the content item;

a normalized representation of a measure of similarity between the query and a name of the home team associated with the content item;

a normalized representation of a measure of similarity between the query and a name of the away team associated with the content item; or a normalized representation of an amount of time to a start time associated with the content item.

12. The system of claim 8, wherein the deep ML model comprises a modified version of a deep learning recommendation model (DLRM).

13. The system of claim 8, wherein the mapping comprises mapping each one of the one or more query features to two different embedding vectors using two different hash functions.

14. A non-transitory computer-readable medium having instructions stored thereon that, when executed by at least one computing device, causes the at least one computing device to perform operations for ranking a plurality of content items for presentation to a user in response to a submission of a query, the operations comprising:

generating a ranking score for each content item in the plurality of content items, wherein the generating the ranking score comprises, for each content item of the plurality of content items:

providing input to a deep machine learning (ML) model, the input including at least one or more query features associated with the query and one or more content item features associated with the content item;

mapping, by the deep ML model, each of the one or more query features to a plurality of embedding vectors using a corresponding plurality of hash functions, each of the embedding vectors being of a dimension;

processing, by a first multi-layer perceptron (MLP) of the deep ML model, a representation of the one or more content item features to generate processed content item features each as a vector of the dimension;

computing, by the deep ML model, dot products between all pairs of the embedding vectors and the processed content item features;

concatenating, by the deep ML model, the dot products with processed content item features to provide concatenated features;

post-processing, with a second MLP of the deep ML model, the concatenated features to provide post-processed concatenated features;

determining, by a third MLP of the deep ML model and based at least on the post-processed concatenated features, a first probability of a first type of user-item interaction between the user and the content item, wherein the first type of interaction between the user and the content item comprises the user launching the content item for playback;

determining, by a fourth MLP of the deep ML model and based at least on the post-processed concatenated features, a second probability of a second type of user-item interaction between the user and the content item, wherein the second type of interaction between the user and the content item comprises the user interacting with a user interface (UI) control associated with the content item to obtain information about the content item; and calculating the ranking score for the content item based at least on the first probability and the second probability; and ranking the plurality of content items for presentation to the user based on the ranking score associated with each content item in the plurality of content items.

15. The non-transitory computer-readable medium of claim 14, wherein the input further includes one or more user features associated with the user.

16. The non-transitory computer-readable medium of claim 14, wherein the plurality of content items comprise a plurality of recorded shows, and wherein the one or more content item features associated with the content item comprise one or more of:
- a content item identifier (ID) associated with the content item;
- a content type associated with the content item;
- an audio language associated with the content item;
- an origin country associated with the content item;
- a normalized representation of a number of times that a plurality of users have launched the content item for playback over a first predefined time period;
- a normalized representation of a number of times that the plurality of users have interacted with the UI control associated with the content item to obtain information about the content item over a second predefined time period;
- a weighted sum of (i) a click through rate (CTR) for the content item when the content item was presented in relation to a submission of the query and (ii) a CTR for the content item when the content item was presented generally, wherein each CTR represents a number of times the plurality of users have interacted with the UI control associated with the content item to obtain information about the content item divided by a number of times the content item was presented to the plurality of users; or
- a weighted sum of (i) a long watch rate for the content item when the content item was presented in relation to a submission of the query and (ii) a long watch rate for the content item when the content item was presented generally, wherein each long watch rate represents a number of times the plurality of users watched the content item for longer than a third predefined time period.

17. The non-transitory computer-readable medium of claim 14, wherein the plurality of content items comprise a plurality of televised sporting events, and wherein the one or more content item features associated with the content item comprise one or more of:
- a sports league title associated with the content item;
- a live event or upcoming event classification associated with the content item;
- an identifier (ID) of a home team associated with the content item;
- an ID of an away team associated with the content item;
- a normalized representation of a number of times that a plurality of users have launched the content item for playback over a first predefined time period;
- a normalized representation of a number of times that the plurality of users have interacted with the UI control associated with the content item to obtain information about the content item over a second predefined time period;
- a normalized representation of a measure of similarity between the query and the sports league title associated with the content item;
- a normalized representation of a measure of similarity between the query and a name of the home team associated with the content item;
- a normalized representation of a measure of similarity between the query and a name of the away team associated with the content item; or
- a normalized representation of an amount of time to a start time associated with the content item.

18. The non-transitory computer-readable medium of claim 14, wherein the deep ML model comprises a modified version of a deep learning recommendation model (DLRM).

19. The non-transitory computer-readable medium of claim 14, wherein the mapping comprises mapping each one of the one or more query features to two different embedding vectors using two different hash functions.

20. The non-transitory computer-readable medium of claim 19, wherein the mapping uses a MurmurHash non-cryptographic hash function with two different seed values.

* * * * *

UNITED STATES PATENT AND TRADEMARK OFFICE
CERTIFICATE OF CORRECTION

PATENT NO. : 12,461,929 B2
APPLICATION NO. : 18/195041
DATED : November 4, 2025
INVENTOR(S) : Kumar et al.

Page 1 of 1

It is certified that error appears in the above-identified patent and that said Letters Patent is hereby corrected as shown below:

In the Claims

In Column 23, Claim 8, Line 30, delete "item;" and insert -- item; and --, therefor.

Signed and Sealed this
Twenty-third Day of December, 2025

John A. Squires
*Director of the United States Patent and Trademark Office*